United States Patent
Floratou et al.

(10) Patent No.: US 10,067,885 B2
(45) Date of Patent: *Sep. 4, 2018

(54) CACHING POLICIES FOR SELECTION AND REPLACEMENT OF OBJECTS

(71) Applicant: International Business Machines Corporation, Armonk, NY (US)

(72) Inventors: Avrilia Floratou, San Jose, CA (US); Uday B. Kale, Olathe, KS (US); Nimrod Megiddo, Palo Alto, CA (US); Fatma Ozcan, San Jose, CA (US); Navneet S. Potti, Madison, WI (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/358,477

(22) Filed: Nov. 22, 2016

(65) Prior Publication Data
US 2017/0075819 A1 Mar. 16, 2017

Related U.S. Application Data

(63) Continuation of application No. 14/741,497, filed on Jun. 17, 2015, now Pat. No. 9,779,031.

(51) Int. Cl.
*G06F 12/08* (2016.01)
*G06F 12/126* (2016.01)
*G06F 12/0891* (2016.01)
*G06F 12/0888* (2016.01)
*G06F 12/0804* (2016.01)

(52) U.S. Cl.
CPC ........ *G06F 12/126* (2013.01); *G06F 12/0888* (2013.01); *G06F 12/0891* (2013.01); *G06F 12/0804* (2013.01); *G06F 2212/60* (2013.01)

(58) Field of Classification Search
None
See application file for complete search history.

(56) References Cited

U.S. PATENT DOCUMENTS 9,779,031 B2  10/2017 Floratou et al.
2008/0256294 A1* 10/2008 Gill ..................... G06F 12/0897
                                                    711/117

OTHER PUBLICATIONS

List of IBM Patents or Patent Applications Treated as Related; (Appendix P), Filed Feb. 15, 2018; 2 pages.

* cited by examiner

*Primary Examiner* — Duc Doan
(74) *Attorney, Agent, or Firm* — Cantor Colburn LLP

(57) ABSTRACT

In one embodiment, a computer-implemented method includes inserting a set of accessed objects into a cache, where the set of accessed objects varies in size. An object includes a set of object components, and responsive to receiving a request to access the object, it is determined that the object does not fit into the cache given the set of accessed objects and a total size of the cache. A heuristic algorithm is applied, by a computer processor, to identify in the set of object components one or more object components for insertion into the cache. The heuristic algorithm considers at least a priority of the object compared to priorities of one or more objects in the set of accessed objects. The one or more object components are inserted into the cache.

6 Claims, 5 Drawing Sheets

CACHING POLICIES FOR SELECTION AND REPLACEMENT OF OBJECTS

DOMESTIC PRIORITY

This application is a continuation of and claims priority from U.S. patent application Ser. No. 14/741,497, filed on Jun. 17, 2015, entitled "CACHING POLICIES FOR SELECTION AND REPLACEMENT OF OBJECTS," the content of which is incorporated herein by reference in its entirety.

BACKGROUND

Various embodiments of this disclosure relate to caching policies and, more particularly, to caching policies for selection and replacement of objects.

Main-memory caches are generally faster to access than secondary storage. The size of a cache limits the amount of data that can be stored there. Because a cache is generally smaller than secondary storage, data in the cache is regularly replaced to allow room for data that is likely to be used in the near future. Given a good replacement policy, a processor can quickly access data it needs by reading from the cache, thereby avoiding having to fetch the data from secondary storage.

Various cache replacement policies exist for replacing data in the cache with alternate data. A least-recently-used (LRU) method makes space in the cache for a newly accessed object by replacing a least-recently-used object. The LRU-K method replaces the object whose $K^{th}$ most recent access is furthest in the past. The least-frequently-used (LFU) method replaces the object in the cache that has been accessed the fewest number of times.

SUMMARY

In one embodiment of this disclosure, a computer-implemented method includes inserting a set of accessed objects into a cache, where the set of accessed objects varies in size. An object includes a set of object components, and responsive to receiving a request to access the object, it is determined that the object does not fit into the cache given the set of accessed objects and a total size of the cache. A heuristic algorithm is applied, by a computer processor, to identify in the set of object components one or more object components for insertion into the cache. The heuristic algorithm considers at least a priority of the object compared to priorities of one or more objects in the set of accessed objects. The one or more object components are inserted into the cache.

In another embodiment, a system includes a memory having computer readable instructions and one or more processors for executing the computer readable instructions. The computer readable instructions include inserting a set of accessed objects into a cache, where the set of accessed objects varies in size. An object includes a set of object components. Further according to the computer readable instructions, and responsive to receiving a request to access the object, it is determined that the object does not fit into the cache given the set of accessed objects and a total size of the cache. A heuristic algorithm is applied to identify in the set of object components one or more object components for insertion into the cache. The heuristic algorithm considers at least a priority of the object compared to priorities of one or more objects in the set of accessed objects. The one or more object components are inserted into the cache.

In yet another embodiment, a computer program product for managing a cache includes a computer readable storage medium having program instructions embodied therewith. The program instructions are executable by a processor to cause the processor to perform a method. The method includes inserting a set of accessed objects into a cache, where the set of accessed objects varies in size. An object includes a set of object components. Further according to the method, and responsive to receiving a request to access the object, it is determined that the object does not fit into the cache given the set of accessed objects and a total size of the cache. A heuristic algorithm is applied to identify in the set of object components one or more object components for insertion into the cache. The heuristic algorithm considers at least a priority of the object compared to priorities of one or more objects in the set of accessed objects. The one or more object components are inserted into the cache.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are caching systems that selectively determine which accessed objects are cached, where the objects may vary in size and may have multiple components. Many caching policies for web-proxy caches have been developed to operate on variable-sized objects. All of these algorithms, however, assume that each object consists of a single component only. Most of these policies are concerned with which objects should be evicted from the cache when a new object is added to the cache, and none provides a smart method for deciding which objects should be placed in the cache. For instance, the conventional algorithms assume that every object accessed must be inserted into the cache. In contrast, embodiments of the caching system herein may select objects for inclusion in the cache, such that not all accessed objects need be cached.

Figure 1:
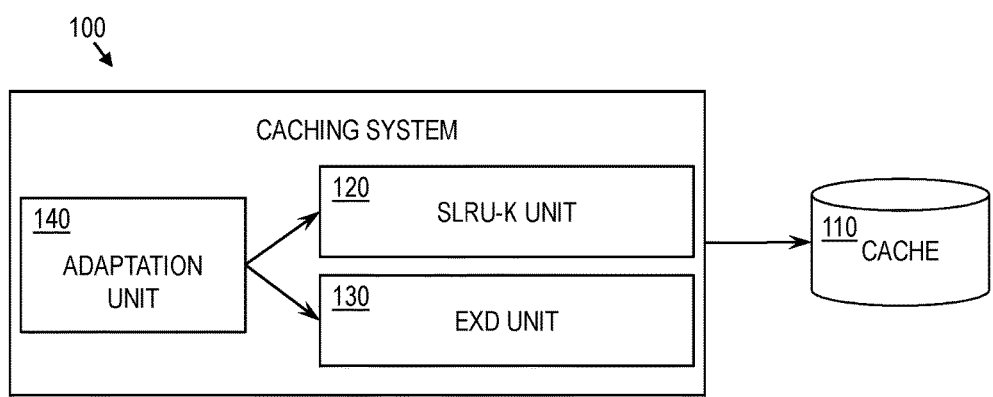
FIG. 1 is a block diagram of a caching system, according to some embodiments of this disclosure.

FIG. 1 is a block diagram of a caching system 100, according to some embodiments of this disclosure. As shown, the caching system 100 may operate on a cache 110.

The caching system 100 may be configured to execute one or more caching algorithms, including, for example, a selective least-recently-used (LRU) algorithm, referred to herein as SLRU-K, which may extend LRU-K methods to selectively determine which objects to cache, and which may be performed by an SLRU-K unit 120 of the caching system 100 in some embodiments. The caching system 100 may also execute an Exponential Decay (EXD) caching algorithm, which may be performed by an EXD unit 130. Further, an adaptation unit 140 may monitor the execution of the SLRU-K unit 120 and the EXD unit 130, so as to modify parameters used in the SLRU-K and EXD algorithms. The SLRU-K unit 120, the EXD unit 130, and the adaptation unit 140 may include hardware, software, or a combination of both. Although these units 120, 130, and 140 are illustrated as being distinct, it will be understood that they may share hardware or software, and that they may be further divided based on implementation.

Figure 2A:
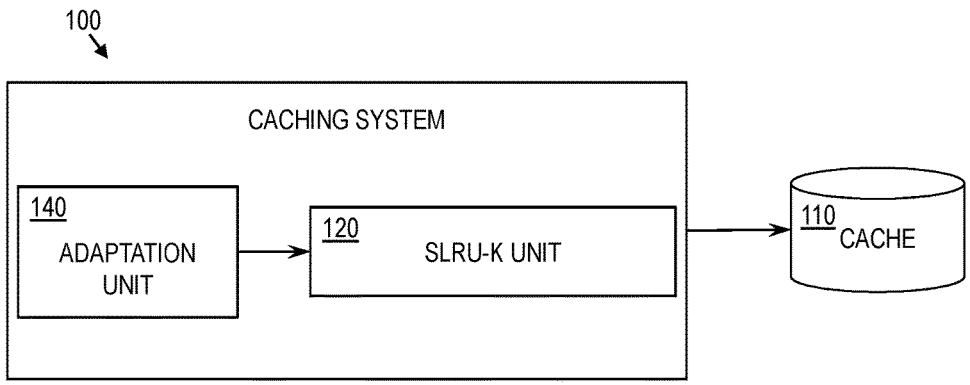
FIGS. 2A-2B are additional block diagrams of the caching system 100, according to some embodiments of this disclosure.
Figure 2B:
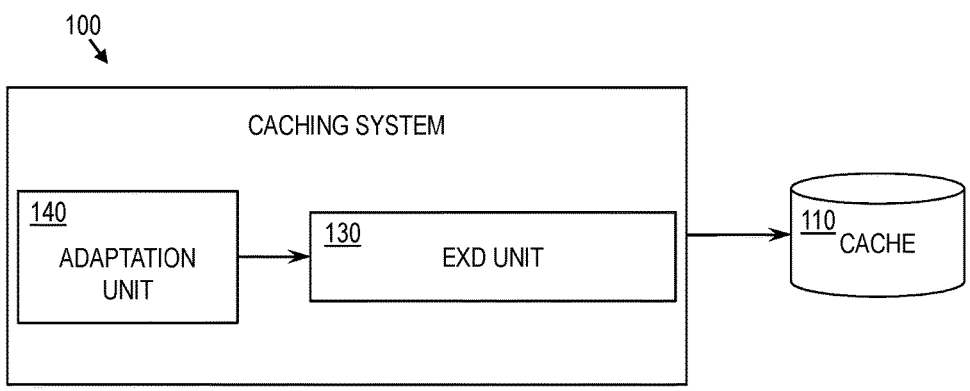

FIGS. 2A and 2B are other block diagrams of the caching system 100, according to some embodiments of this disclosure. The caching system 100 need not implement both the SLRU-K and the EXD algorithms. Rather, as shown in FIG. 2A, the caching system 100 may implement the SLRU-K algorithm without the EXD algorithm, and as shown in FIG. 2B, the caching system 100 may implement the EXD algorithm without the SLRU-K algorithm.

The caching system 100 may be used in various environments, and one of such environments is the Hadoop Distributed File System (HDFS). With HDFS caching, users can pin specific directories in the HDFS cache. A directory consists of at least one file, and file sizes may vary. A directory remains in in the cache until the user decides to unpin it. A directory that is not in the HDFS cache may be accessible without having to bring it into the cache. The caching system 100 may thus be used to determine which directories, and component files, are cached and which ones should be replaced when a new directory is added to the HDFS cache.

The caching system 100 may use a global time counter to simulate time, where the time counter is initiated at time=0 and is incremented each time an object is accessed. In other words, the counter specifies a current time period, where the length of a time period is the time between object accesses, and where the length of time periods can vary based on when objects are accessed.

There may be n objects accessible and cacheable, where the objects are denoted by i=1, . . . n, and $s_i$ denotes the size of an object i, for each i∈[1, n]. Further, $P_i(t)$ is the probability that an object i will be referenced at time t, and cost $c_i$ is the cost of a cache miss, and the benefit of a cache hit, for object i. The value of $c_i$ may depend on $s_i$ and may also depend on one or more object characteristics, such as, for example, the object's source (e.g., network, hard disk, solid state drive, etc.).

Under the notation above, if the cache has a capacity TotalSize, then an optimal set M(t) of items to be in cache at time t is one that maximizes the total benefit of having those objects in the cache. In other words, an optimal set maximizes $$\sum_{i \in M(t)} c_i P_i(t)$$

subject to the capacity constraint $$\sum_{i \in M(t)} s_i \leq C.$$

Formally, the optimization may be modeled by the following integer linear programming formulation of the knapsack problem, using Boolean decision variables $x_i$ to denote the presence of object i in the cache:

$$\text{Maximize} \sum_{i=1}^{n} [c_i P_i(t)] x_i$$

$$\sum_{i=1}^{n} s_i x_i \leq C$$

$$x_i \in \{0, 1\} \ (i = 1, \ldots, n).$$

As is well known, an approximate solution can be obtained by relaxing the integrality constraints, as follows:

$$\text{Maximize} \sum_{i=1}^{n} [c_i P_i(t)] x_i$$

$$\sum_{i=1}^{n} s_i x_i \leq C$$

$$0 \leq x_i \leq 1 \ (i = 1, \ldots, n).$$

This relaxation may give rise to an almost integral solution. Consider a set of ratios $r_i(t) = c_i P_i(t)/s_i$, for i=1, . . . , n. If $r_{i_1}(t) \geq r_{i_2} \geq \ldots$ , then the largest index j such that $$\sum_{j=1}^{J} s_j \leq C$$

may be chosen and placed in the cache as part of the set $M(t) = \{i_1, \ldots, i_J\}$.

Throughout this disclosure, the weight of an object i at time t is denoted as $W_i(t)$ and is defined as $W_i(t) = c_i P_i(t)$ (hereinafter "Definition 1"). As shown in the knapsack problem formulation, the objective function maximizes the total weight in the cache. According to some embodiments, the caching system 100 may use algorithms that employ a heuristic that takes the weights of the objects into account when deciding whether to place a new object in the cache and which objects to evict from the cache. Thus, the caching system 100 may approximate the objective function.

To implement the SLRU-K algorithm, for each object i for i∈[1, n], the caching system 100 may maintain a list $L_i$ of the K most recent accesses to that object. The list may include the time of each of those K accesses and, in some embodiments, may be sorted in order of the accesses. For instance, the list may be $L_i = [t_{i1}, \ldots, t_{iK}]$ where each $t_{ij}$ is equal to the value of the time counter at the $j^{th}$ most recent access of object i. Thus, the time of the last access of the object is represented by $t_{i1}$ and the time of the $K^{th}$ most recent access is represented by $t_{iK}$. The caching system 100 may update the list when the object i is accessed, for example, by shifting the values in the list, such that each $t_{ij}$ for j∈[1, K−1] becomes $t_{ij+1}$, and such that the time counter at the time of the access is stored as a new value for $t_{i1}$. If object i has been accessed fewer than K times, then the caching system 100 need not drop an item from the list, but may simply shift the values and add the new value.

According to some embodiments, the caching system 100 may estimate the probability that an object will be accessed at time t. That probability is denoted herein by $P_i(t)$. This probability may be statistically estimated based on knowledge of the last K accesses of the object. It may be assumed that, at the current time u, each object i has a well-defined probability $P_i(u)$ to be the next object accessed. The list of object accesses may be considered a sequence of random variables. For a given object i and a current time u (i.e., the time counter currently has a value of u), $T_i(u)=u-t_{ik}+1$ is defined as the number of object accesses that happened since object i's $K^{th}$ most recent access. Assuming that a given object's access is a Bernoulli trial, then the sequence of $T_i(u)$ accesses from the object's $K^{th}$ most recent access until the current time u may be modeled as a binomial distribution $B(T_i(u), p_i(u))$. Using maximum-likelihood estimation, it may be determined that a reasonable estimate of $p_i(u)$ is $p_i(u)=K/T_i(u)$ (hereinafter "Equation 1"). The value of $p_i(u)$ may be thought of as a priority indicator for inserting or keeping object i in the cache.

At the current time u, for any future time t>u, the caching system 100 may use the knapsack approximation by making the assumption that $P_i(t) \approx p_i(u)$. It will be understood that the estimate $p_i(u)$ may change over time as more accesses are happening, because the value of $T_i(u)$ may be changing. As these values change, the caching system 100 may take into account the new values of these estimates.

The caching system 100 may assume that the cost $c_i$ of a cache miss of an object i is proportional to the object's size $s_i$. For instance, $c_i=\lambda*s_i$, where $\lambda \geq 1$. This may be a reasonable assumption in cases where the object represents a file read from a hard disk or over the network. In this case, $r_i(t)=\lambda*P_i(t) \approx \lambda*p_i(u)$ and $W_i(t)=c_i*P_i(t) \approx ci*p_i(u)$.

It may be shown that, if $p_i(u)>p_j(u)$ at a time u, then $p_i(u+1)>p_j(u+1)$ for objects i and j that have not been accessed at time u+1. Thus, if $r_i(u)>r_j(u)$, then $r_i(u+1)>r_j(u+1)$. This can be proven as follows:

$$p_i(u)>p_j(u)$$

$$k/T_i(u)>k/T_j(u)$$

$$T_i(u)<T_j(u)$$

$$u-t_{ik}+1<u-t_{jk}+1$$

$$u+1-t_{ik}+1<u+1-t_{jk}+1$$

$$T_i(u+1)<T_j(u+1)$$

$$k/T_i(u+1)<k/T_j(u+1)$$

$$p_i(u+1)>p_j(u+1)$$

In some embodiments, the caching system 100 may maintain data related to each cached object. For example, and not by way of limitation, this data may be maintained as a priority queue CachedObjects, and it will be understood that the priority queue may be implemented in various ways. Each element, or item, of the priority queue may include information about or a reference to the cached object to with it corresponds.

In some embodiments, the items in the priority queue may be sorted based on $r_i(u) \approx \lambda*p_i(u)$, for every object i in the cache. According to the above proof, the relative order of those objects in the queue that are not accessed at time u+1 need not change. In some embodiments, the caching system 100 may change only the position of the currently accessed object, because its list of K recent accesses has changed. Further, the caching system 100 need not store the probability value of each object, but may compute the probabilities on the fly as needed, using the current value of the time counter and the list of K accesses of the object in question.

The probability estimate $p_i(time)$ of an object i may computed as defined in the previous section, unless the object has been accessed fewer than K times, in which case $p_i(time)$ may equal 0. In some embodiments, objects accessed fewer than K times may be considered unpopular and may thus be the first to be replaced when a popular object (i.e., an object not deemed unpopular) is inserted into the cache. For this reason, the probability estimate for these objects may be set to 0. At the kth access of such an object, that probability estimate may be updated according to Equation 1.

The caching system 100 may maintain metadata for each object that is cached, and this metadata may be stored in the CachedObjects priority queue. For example, and not by way of limitation, this metadata may include the following for each object i: the object's list $L_i$ of the K most recent access times, the object's size $s_i$, the object's actual cached size $cs_i$. In some embodiments, the value of $cs_i$ may be set to $s_i$ by default, but $cs_i$ may be less than $s_i$ if the object is only partially cached.

In some embodiments, partial caching may allow the caching system 100 to maintain in the cache a subset of an object's components. As discussed further below, partial caching may enable the caching system 100 to more effectively use the cache space by caching select components of an object that does not completely fit in the cache, where that object is not deemed popular enough to trigger eviction of other objects in the cache to supply the space needed for the entire object. If partial caching is enabled, the caching system 100 may also maintain metadata related to individual cached components of objects.

In some embodiments, the caching system 100 may further maintain history data related to the history of objects accessed and cached. The history data may include metadata about objects that have been accessed, and the history data may be implemented as a hash table keyed by the objects. In some embodiments, to avoid allowing the history data to grow unnecessarily large, the caching system 100 may restrict the number of entries in the history data (e.g., in the hash table representing the history data) or may remove items from the history data that have not been accessed for a threshold period of time.

Figure 3:
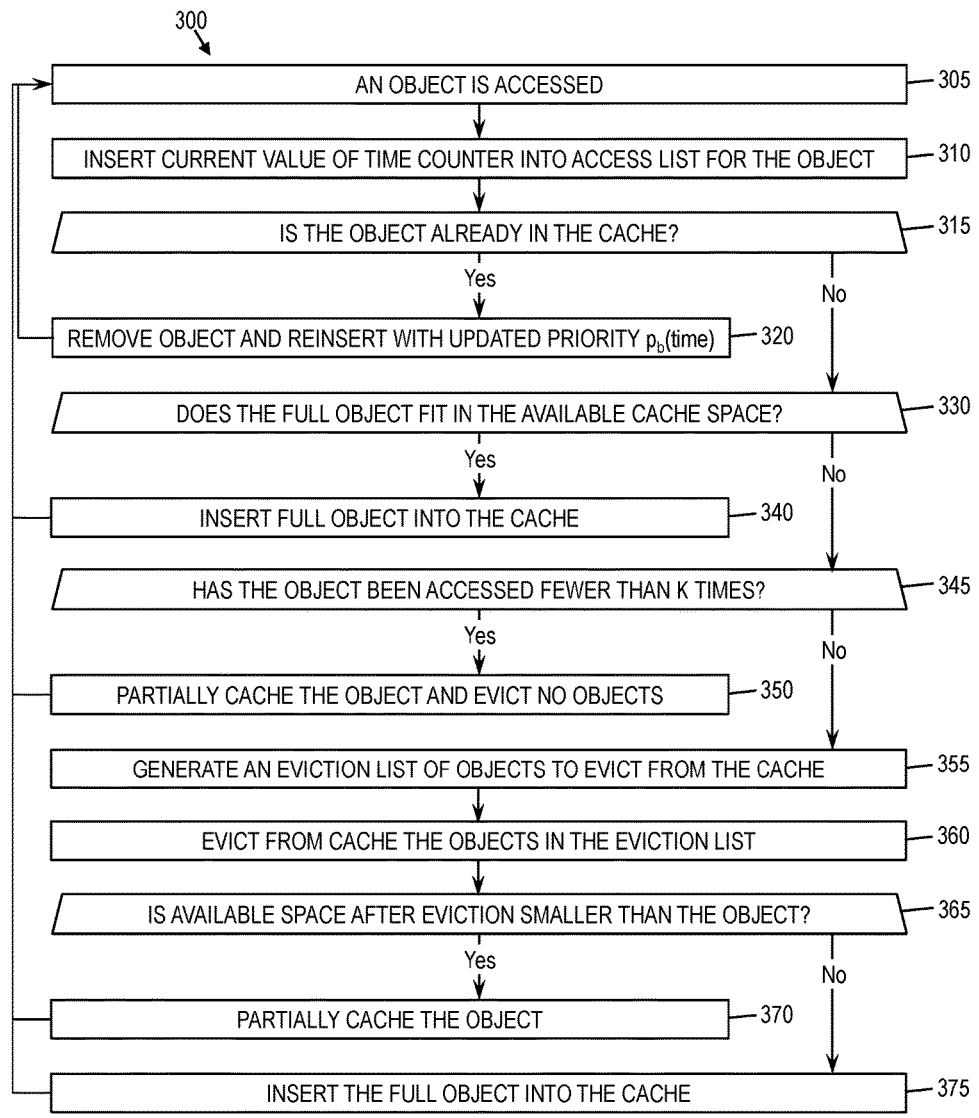
FIG. 3 is a flow diagram of a method for managing a cache using a first algorithm, according to some embodiments of this disclosure.

FIG. 3 is a flow diagram of a method 300 for managing a cache, according to some embodiments of this disclosure. Specifically, this method 300 describes execution of some embodiments of the SLRU-K algorithm.

The cache may have a total size TotalSize, and UsedSize may represent the current size of the cache currently being used to store objects. Initially, before any objects are accessed, UsedSize=0. As discussed above, a time counter may initially be set to 0.

At block 305, an object b is accessed. At block 310, the time counter may be incremented by 1. At block 310, the current value of the time counter may be inserted at the head of the access list $L_b$ for object b. If necessary to maintain no more than K accesses in the list, the least recent access in the list may be dropped. At decision block 315, it may be determined whether object b is stored in the cache. If so, then block 320 may be performed; otherwise, the method 300 may proceed to block 330.

At block 320, for an object already stored in the cache, object b may be removed from the cache and then reinserted with priority $p_b$(time). It will be understood that, if the object was only partially cached before its removal, then this removal and reinsertion of the object may include updating the used size UsedSize of the cache, such that the contribution of the object changes to $cs_b=s_b$, as well as removing metadata related to the individual components of the object that were previously cached. In the case of an object that was fully cached at the time of the access, the caching system 100 need not update the used size of the cache, because this size may remain unchanged through removal and reinsertion. Additionally, in some embodiments, the history data may be updated to indicate the new access to object b. If object b does not yet have an entry in the history data, then this updating may include creating such an entry. After block 320, the method 300 may return to block 305, where a new object may be accessed.

At decision block 330, for an object b not already in the cache at the time of the access, it may be determined whether the full object b fits into the available cache space. In other words, it may be determined whether $s_b$+UsedSize≤TotalSize. At block 340, if the full object b would fit into the cache, then the full object b may be inserted into the cache. In that case, $cs_b=s_b$ and UsedSize=UsedSize+$s_b$. After inserting object b into the cache, the method 300 may return to block 305, where a new object may be accessed. On the other hand, if the full object b would not fit into the cache, then the caching system 100 may decide whether to cache object b, and whether to do so in full or only in part. This may occur beginning at block 345.

Specifically, at decision block 345, it may be determined whether the object b has been accessed fewer than K times. If the object b has been accessed fewer than K times, then the object b may be deemed unpopular, and the caching system 100 may opt not to remove another object from the cache. In that case, at block 350, the caching system 100 may partially cache object b and may determine which components of object b to insert into the cache. Various existing mechanisms may be used to select which components of object b to cache given the available space. For example, and not by way of limitation, the caching system 100 may consider each component in turn, and may select the current component for caching if the current component will fit in the cache along with all other selected components. The value of $cs_b$ may be set to the combined size of the components of object b that are added to the cache, and UsedSize may be updated accordingly. The method 300 may then return to block 305, where a new object may be accessed.

If object b has been accessed at least K times, for an object that would overfill the cache if simply added in full, then the object b may be deemed popular, and the caching system 100 may decide which, if any, objects to evict from the cache to accommodate object b. In that case, at block 355, an eviction list may be generated, including objects for eviction to make room in the cache for the object b. During generation of the eviction list, the caching system 100 may also determine which components of object b, if any, will be inserted into the cache.

To generate an eviction list, the weight of object b may be computed as $W_b$(time), according to Definition 1. The caching system 100 may maintain the sum of the weights, SumWeights, of objects to be evicted, where initially SumWeights=0. The available space in the cache is FreeSpace=TotalSize−UsedSize. In the CachedObjects priority queue, in which the cached objects are ordered by the ratio $r_i(t)=c_iP_i(t)/s_i$, the caching system 100 may consider these objects in ascending order of ratio, by performing the following operations in an iterative loop. For each such object c, the caching system 100 may compute the corresponding weight $W_c$(time). If the weight of objects in the eviction list added to the weight of the current object is less than the weight of object b (i.e., if SumWeights+$W_c$(time)<$W_b$(time)), then the current object c may be added to the eviction list. When adding the current object to the eviction list, SumWeights=SumWeights+$W_c$(time), and FreeSpace=FreeSpace+$cs_c$. If FreeSpace is at least the size of object b (i.e., if FreeSpace≥$s_b$), then the eviction list may be returned, and the loop of considering each cached object for the eviction list may end. Otherwise, the next cached object in the CachedObjects queue may be considered for adding to the eviction list. Alternatively, if the weight of objects in the eviction list added to the weight of the current object equals at least the weight of object b (i.e., if SumWeights+$W_c$(time)≥$W_b$(time)), then the caching system 100 may attempt to select components of the current object to be added to the eviction list. In this case, the caching system 100 may step through the components of the current object and may add to the eviction list a selected subset of those components. Various mechanisms exist in the art for determining which individual components of object b to evict and, thus, to select for the eviction list. For each component added to the eviction list, SumWeights may be increased by the weight of that component, and FreeSpace may be increased by the size of that component. If FreeSpace is greater than the size of object b, then the eviction list may be returned, and the loop of considering each cached object for the eviction list may end.

After the loop through the cached objects to construct an eviction list has ended, the objects in the eviction list may be evicted at block 360, and their corresponding cs values may be updated accordingly. At decision block 365, it may be determined whether the available space in the cache after evicting the objects in the eviction list would be less than the size of object b. In other words, it may be determined whether FreeSpace<$s_b$. If that is the case, then it may be decided that it is not beneficial to fit the entirety of object b into the cache, and at block 370, object b may be partially cached. Various mechanisms exist in the art for determining which individual components of object b to cache. Alternatively, if FreeSpace≥$s_b$, then at block 375, object b may be cached in full. In either case, UsedSize and $cs_b$ may be updated accordingly, and the method may return to block 305, where a new object may be accessed.

In some embodiments, the caching system 100 may implement an EXD caching algorithm, alternatively or in addition to the SLRU-K algorithm, to determine which objects are stored in the cache.

In this disclosure, $S_i(t)$ is the score of a cacheable object i at time t, and once again, [$t_{i1}$, ..., $t_{ik}$] are times at which the object i was previously accessed, where $t_{i1}>t_{i2}>...>t_{ik}$ Further, define the score $S_i(t)$ as $S_i(t)=e^{-a(t-t_{i1})}+e^{-a(t-t_{i2})}+...$, where a>0 is a constant whose value can be chosen adaptively.

For a given object i, it may be assumed as a working hypothesis that $S_i(t)$ is proportional to $P_i(t)$. For an object i, the score $S_i(t_{i1}+\Delta t)$ may be calculated from the most recent time of access $t_{i1}$ and the score $S_i(t_{i1})$. If the object i is not accessed during the interval [$t_{i1}$, $t_{i1}+\Delta t$], then $S_i(t_{i1}+\Delta t)=S_i(t_{i1})*e^{-A\Delta t}$ (hereinafter "Equation 2"). If the object i is accessed at $t_{i1}+\Delta t$ for the first time after $t_{i1}$, then $S_i(t_{i1}+\Delta t)=S_i(t_{i1})*e^{-A\Delta t}+1$ (hereinafter "Equation 3").

Thus, the score $S_i(t)$ may be calculated for a future time $t>t_{i1}$ before the next access. Furthermore, the scores may decay exponentially and may be approximated, or rounded, to 0 after they drop below a threshold. As a result, some embodiments may stop maintaining history for objects that have not been accessed for a long time (e.g., a predetermined number of increments of the time counter).

At a current time u, for any future time t>u, the SLRU-K algorithm may use the knapsack approximation with the assumption that $P_i(t) \propto S_i(u)$, and thus $r_i(t) \propto c_i S_i(u)/s_i$. Additionally, $W_i(t)=c_i*P_i(t) \propto c_i*S_i(u)$. In practice, for the EXD algorithm, as in the SLRU-K algorithm, $c_i=\lambda*s_i$.

For a given time u, if $r_i(u)>r_j(u)$ then $r_i(u+\Delta u)>r_j(u+\Delta u)$ for all i, j that have not been accessed during the interval [u, u+Δu), which includes the endpoint time u and excludes the endpoint time u+Δu.

In some embodiments, Equation 2 implies that, between object accesses, the order on the set of objects, where those objects have not been accessed during the time interval [u, u+Δu), implied by the ratios does not change. In other words, it may be the case that:

$$\frac{c_i S_i(u)}{s_i} > \frac{c_j S_j(u)}{s_j} \Leftrightarrow \frac{c_i S_i(u+\Delta u)}{s_i} > \frac{c_j S_j(u+\Delta u)}{s_j}.$$

Thus, $r_i(u)>r_j(u) \Leftrightarrow r_i(u+\Delta u)>r_j(u+\Delta u)$.

As discussed above, the caching system 100 may maintain a priority queue, CachedObjects, containing information about the objects contained in the cache at time u. For execution of the EXD algorithm, the items in the priority queue may be sorted according to $\log [r_i(u)]$, for all corresponding objects i in the cache. In this algorithm, the log of the ratio may be considered a priority indicator for its corresponding object. By using the log of the ratio, the caching system 100 may improve efficiency of numerical computations, as compared to using exponential operations. As discussed above, the score $Si(t_{i1}+\Delta t)$ may be calculated from the most recent time of access $t_{i1}$ and the score $S_i(t_{i1})$. Thus, in some embodiments, the relative order of the objects in the priority queue that have not been accessed during a time interval need not change during that time interval. Further, it may follow from Equation 3 that the only change in the order takes place when a new object is accessed. That change may be in the position of the accessed object, whose score may be incremented by 1.

In some embodiments, for each item j in the priority queue, the caching system 100 may retain only the most recent time of access $t_{j1}$ of object j and $\log [r_j(t_{j1})]$. When object i is accessed at time u, its updated log of the ratio $\log [r_i(u)]$ may be calculated as $\log [r_i(u)] = \log [e^{\log [r_i(t_{i2})] - A(u-t_{i2})} + d_i]$, where $d_i = c_i/s_i$, such that $d_i = \lambda$ when $c_i = \lambda*s_i$.

Thus, the comparison of the newly accessed $r_i(u)$ to another $r_j(u)$ may be performed by comparing $\log [r_i(u)]$ to $\log [r_j(u)] = \log [r_j(t_{j1})] - A(u-t_{j1})$.

Figure 4:
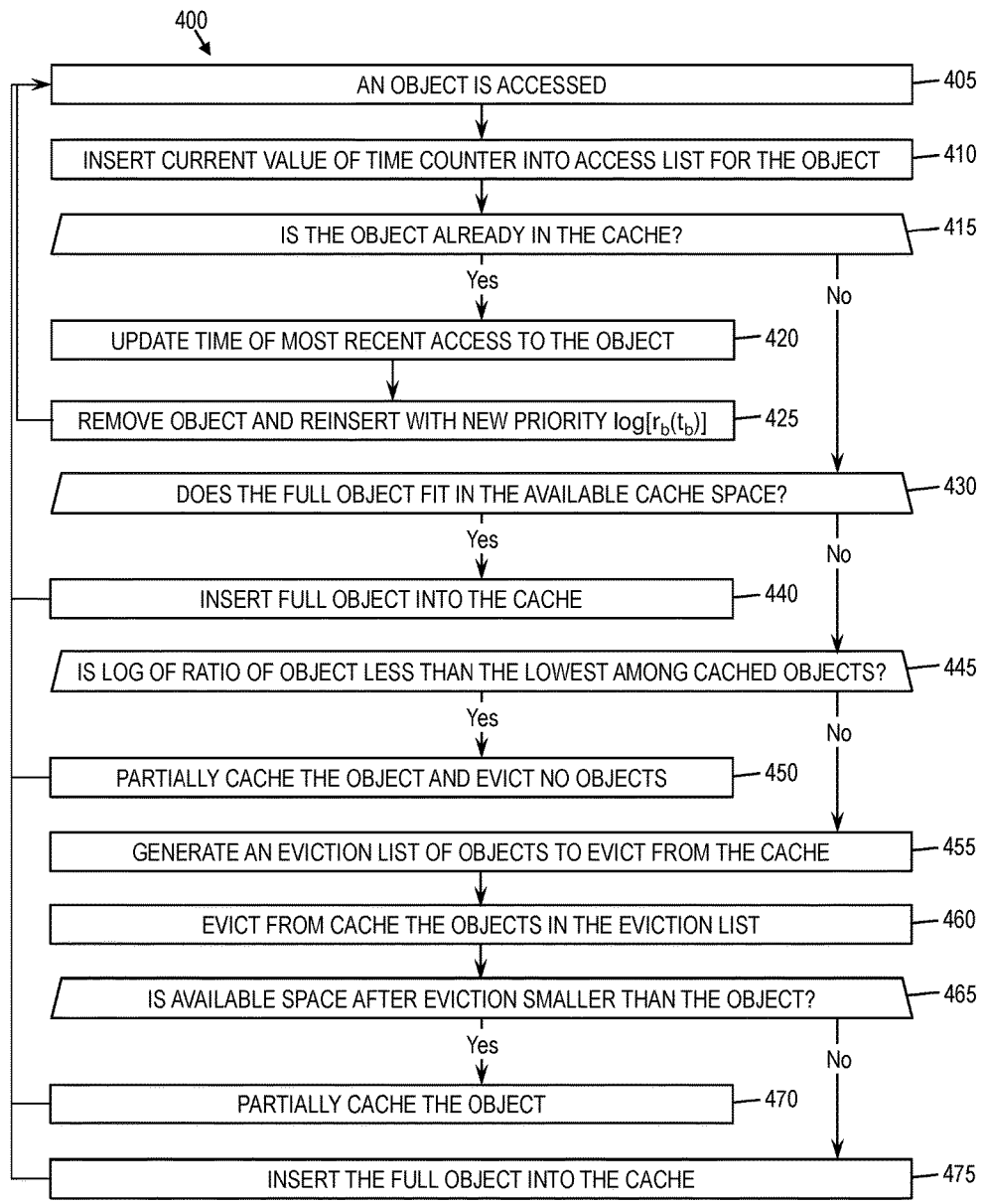
FIG. 4 is a flow diagram of a method for managing a cache using a second algorithm, according to some embodiments of this disclosure.

FIG. 4 is a flow diagram of a method 400 for managing a cache, according to some embodiments of this disclosure. Specifically, this method 300 describes execution of some embodiments of the EXD algorithm.

As with the SLRU-K algorithm, the cache may have a total size TotalSize, and UsedSize may represent the current size of the cache currently being used to store objects. Initially, before any objects are accessed, UsedSize=0, and the time counter may be set to 0.

At block 405, an object b is accessed. At block 410, the time counter may be incremented by 1. At decision block 415, it may be determined whether object b is stored in the cache. If so, then blocks 420-425 may be performed; otherwise, the method 400 may proceed to block 430.

At block 420, for an object b already stored in the cache, the most recent access to the object $t_b$ may be updated. At block 425, object b may be removed from the cache and then reinserted with priority $\log [r_b(t_b)]$. It will be understood that, if the object was only partially cached before its removal, then this removal and reinsertion of the object may include updating the used size UsedSize of the cache, such that the contribution of the object changes to $cs_b = s_b$, as well as removing metadata related to the individual components of the object that were previously cached. After block 425, the method 400 may return to block 405, where a new object may be accessed.

At decision block 430, for an object b not already in the cache at the time of the access, it may be determined whether the full object b fits into the available cache space. In other words, it may be determined whether $s_b + \text{UsedSize} \leq \text{TotalSize}$. At block 440, if the full object b would fit into the cache, then the full object b may be inserted into the cache. In that case, $cs_b = s_b$ and $\text{UsedSize} = \text{UsedSize} + s_b$. After inserting object b into the cache, the method 400 may return to block 405, where a new object may be accessed. On the other hand, if the full object b would not fit into the cache, then the caching system 100 may decide whether to cache object b, and whether to do so in full or only in part. This may occur beginning at block 445.

Specifically, at decision block 445, it may be determined whether the log of the ratio $\log [r_b(t_{b1})]$ of the object b is less than the lowest log of the ratio of the currently cached objects (i.e., lower than the log of the ratio of the first object in the CachedObjects priority queue, which may be ordered by ascending log of the ratios). If the log of the ratio of object b is lower, then the caching system 100 may opt not to remove another object from the cache. In that case, at block 450, the caching system 100 may partially cache object b and may determine which components of object b to insert into the cache. The value of $cs_b$ may be set to the combined size of the components of object b that are added to the cache, and UsedSize may be updated accordingly. The method 400 may then return to block 405, where a new object may be accessed.

Alternatively, if the object b has a log of the ratio that is greater than or equal to the lowest log of the ratio of cached objects, then the caching system 100 may select a set of cached objects to evict from the cache to accommodate part or all of object b. In that case, at block 455, an eviction list may be generated, including objects for eviction to make room in the cache for the object b. During generation of the eviction list, the caching system 100 may also determine which components of object b, if any, will be inserted into the cache.

To generate an eviction list, the weight of object b may be computed as $W_b(\text{time})$, according to Definition 1. The caching system 100 may maintain the sum of the weights, SumWeights, of objects to be evicted, where initially SumWeights=0. The available space in the cache is FreeSpace=TotalSize−UsedSize. In the CachedObjects priority queue, in which the cached objects are ordered by log of the ratio, the caching system 100 may consider these objects in ascending order of log of the ratio. For each such object c, the caching system 100 may compute the corresponding weight $W_c(\text{time})$. If the weight of objects in the eviction list added to the weight of the current object is less than the weight of object b (i.e., if SumWeights+$W_c$(time)<$W_b$(time)), then the current object c may be added to the eviction list. When adding the current object to the eviction list, SumWeights=SumWeights+$W_c$(time), and FreeSpace=FreeSpace+$cs_c$. If FreeSpace is at least the size of object b (i.e., if FreeSpace≥$s_b$), then the eviction list may be returned, and the loop of considering each cached object for the eviction list may end. Otherwise, the next cached object in the CachedObjects queue may be considered for adding to the eviction list. Alternatively, if the weight of objects in the eviction list added to the weight of the current object equals at least the weight of object b (i.e., if SumWeights+$W_c$(time)≥$W_b$(time)), then the caching system 100 may attempt to select components of the current object to be added to the eviction list. In this case, the caching system 100 may step through the components of the current object and may add to the eviction list a selected subset of those components. Various mechanisms exist in the art for determining which individual components of object b to evict and, thus, to select for the eviction list. For each component added to the eviction list, SumWeights may be increased by the weight of that component, and FreeSpace may be increased by the size of that component. If FreeSpace is greater than the size of object b, then the eviction list may be returned, and the loop of considering each cached object for the eviction list may end.

After the loop through the cached objects to construct an eviction list has ended, the objects in the eviction list may be evicted at block 460, and their corresponding cs values may be updated accordingly. At decision block 465, it may be determined whether the available space in the cache after evicting the objects in the eviction list would be less than the size of object b. In other words, it may be determined whether FreeSpace<$s_b$. In this case, it may be determined that it is not beneficial to fit the entirety of object b into the cache, and at block 470, and object b may be partially cached. Alternatively, if FreeSpace≥$s_b$, then at block 475, object b may be cached in full. In either case, UsedSize and $cs_b$ may be updated accordingly.

The scoring function, $S_i(t)$, of the EXD algorithm may depend on a parameter A. The value of this parameter may determine how recency and frequency are balanced in a single score. With a larger value for the parameter A, there is a heavier emphasis on recency versus frequency. Analogously, a smaller value for the parameter A leads to a heavier emphasis on frequency versus recency. Similarly, the behavior of the SLRU-K algorithm may depend on the value of K.

Some embodiments of the caching system 100 may use an auto-tuning mechanism for the values of A and K, so as to provide improved efficiency, which may be measured in the form of a high byte-hit ratio or a low byte-insertion ratio, for example. The initial values considered by the caching system 100 may be received from, for example, the system administrator and may cover a wide range of possible values. The adaptation unit 140 may be implemented as a separate thread or process from the running SLRU-K and EXD algorithms. The adaptation unit 140 may observe the byte-hit ratio and the byte-insertion ratio of the algorithms as they run and may periodically adjust the values of the parameters A and K as needed.

The adaptation unit 140 may have a fixed list of values for each parameter (i.e., parameter A or K). When performing one of the above SLRU-K and EXD algorithms, the caching system 100 may proceed with a current value of, respectively, parameter A or parameter K. The caching system 100 may occasionally update its values of A, K, or both based on feedback received from performing the corresponding algorithms, so as to improve the efficiency of the algorithms. For example, and not by way of limitation, the caching system 100 may use the adaptation unit 140 to update the parameter values after a predetermined number of time periods counted by the time counter, or after a predetermined number of object accesses.

The adaptation unit 140 may keep track of the byte-hit rates and byte-insertion rates that correspond to the values of each parameter. In some embodiments, when the adaptation unit 140 is evoked to return a new value of a parameter, the adaptation unit 140 may group the previous values of that parameter based on their corresponding byte-hit ratios. In other words, values of the parameter with similar byte-hit ratios may be placed in the same group as one another. The adaptation unit 140 may randomly select a group of values, with selection probability proportional to the average byte-hit rate within that group. After selecting the group, the adaptation unit 140 may select the value of parameter that has the lowest byte-insertion ratio within the group. This selected value may then become the new value for that parameter. It will be understood, however, that other mechanisms may be used to select the new value. The caching system 100 may use the new value of the parameter until the next parameter value is selected.

Figure 5:
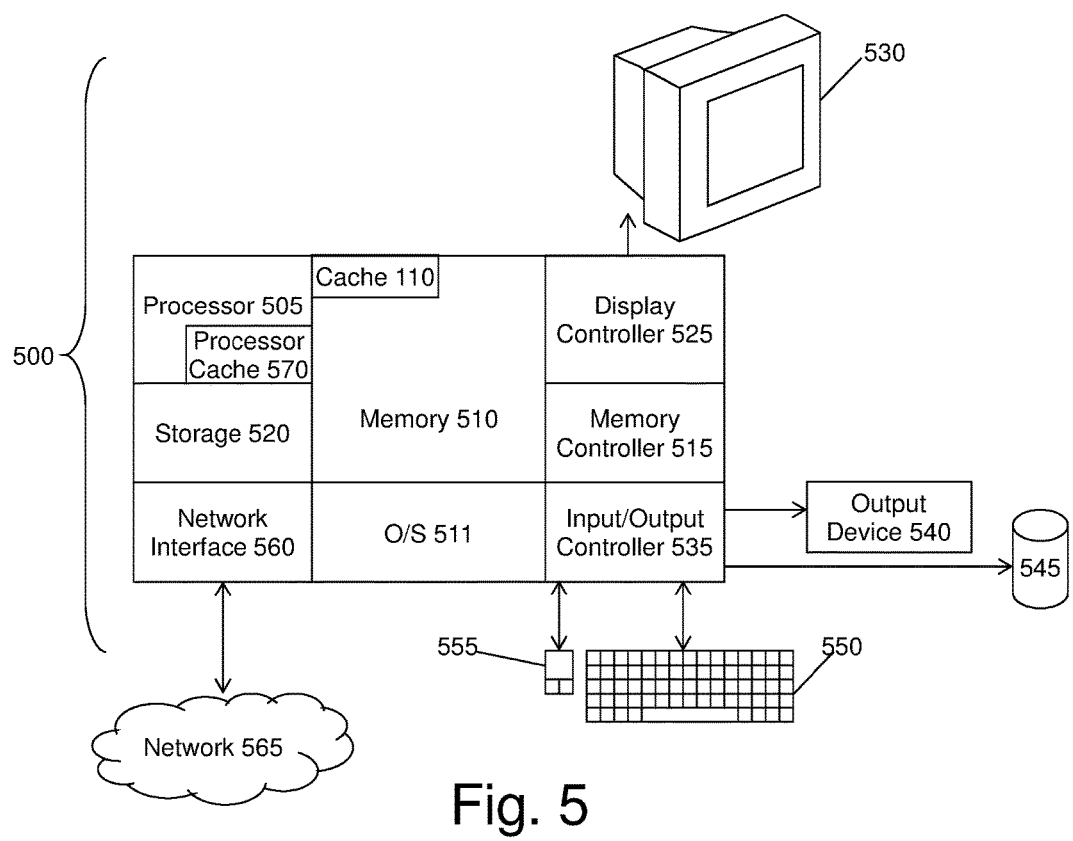
FIG. 5 is a block diagram of a computing device for implementing some or all aspects of the caching system, according to some embodiments of this disclosure.

FIG. 5 illustrates a block diagram of a computer system 500 for use in implementing a caching system 100 or method according to some embodiments. The caching systems 100 and methods described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a processor cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The processor cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505. Additionally, the memory 510 may include a main-memory cache 110, on which various embodiments of the caching system 100 may operate.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the caching systems 100 and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Caching systems and methods according to this disclosure may be embodied, in whole or in part, in computer program products or in computer systems 500, such as that illustrated in FIG. 5.

Technical effects and benefits of some embodiments include the ability to selectively determine which of a set of variable-sized objects, each made up of one or more components, to insert into the cache. In conventional systems, each accessed object is generally added to the cache. In contrast, some embodiments may choose only a subset of accessed objects to insert into the cache, to potentially avoid inserting objects that are unlikely to be used in the near future or are associated with lower cost cache misses, in favor of objects more likely to be used or associated with higher cost cache misses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
 inserting a set of accessed objects into a cache, the set of accessed objects varying in size; and
 responsive to receiving a request to access a first object, the first object comprising a set of object components:
  determining that the first object does not fit into the cache given the set of accessed objects and a total size of the cache;
  applying, by a computer processor, a heuristic algorithm to identify in the set of object components one or more object components for insertion into the cache, the heuristic algorithm considering at least a priority of the first object compared to priorities of one or more objects in the set of accessed objects;
  wherein applying the heuristic algorithm comprises generating an eviction list of objects in the set of accessed objects, wherein each object in the eviction list has a weight, and wherein the sum of the weights of the objects in the eviction list is no greater than a weight of the first object;
  evicting from the cache the objects in the eviction list; and
  inserting into the cache the one or more object components of the first object.

2. The method of claim 1, wherein applying the heuristic algorithm comprises:
   determining that the first object is unpopular;
   wherein at least one of set of object components is excluded from the one or more object components identified for insertion into the cache, responsive to the determinations that the first object does not fit in the cache and the first object is unpopular.

3. The method of claim 1, wherein the priority of the first object and the priorities of the one or more objects in the set of accessed objects are adaptive over time based on a measured efficiency of the heuristic algorithm.

4. The method of claim 1, wherein applying the heuristic algorithm comprises:
   determining that the first object has a lower log of ratio than each object in the set of accessed objects;
   wherein at least one of set of object components is excluded from the one or more object components identified for insertion into the cache, responsive to the determinations that the first object does not fit in the cache and the first object has a lower log of ratio than each object in the set of accessed objects.

5. The method of claim 1, wherein the weight of the first object is based on a probability that the first object will be accessed.

6. The method of claim 5, wherein the weight of the first object is further based on a cost of a cache miss for the first object.

* * * * *